United States Patent
Salisbury

[11] 3,915,096
[45] Oct. 28, 1975

[54] SELF-CONTAINED PNEUMATIC LOAD RESTRAINING APPARATUS

[75] Inventor: Robert E. Salisbury, Whittier, Calif.

[73] Assignee: Preco Inc., Los Angeles, Calif.

[22] Filed: Dec. 23, 1974

[21] Appl. No.: 535,215

[52] U.S. Cl. .................. 105/492; 105/494; 105/376
[51] Int. Cl.² .......................................... B61D 45/00
[58] Field of Search .......... 105/468, 494, 492, 496, 105/376; 214/10.5 D

[56] References Cited
UNITED STATES PATENTS

| | | | |
|---|---|---|---|
| 3,427,997 | 2/1969 | Brown et al. | 105/468 |
| 3,791,311 | 10/1971 | Loomis | 105/494 X |
| 3,851,597 | 12/1974 | Stone | 105/492 |
| 3,877,393 | 4/1975 | Loomis et al. | 105/492 |

Primary Examiner—M. Henson Wood, Jr.
Assistant Examiner—Gene A. Church

[57] ABSTRACT

Improved apparatus is described for supplying air to pneumatic cushioning devices for restraining the lading in freight-carrying vehicles such as railroad freight cars. Air storage chambers are directly carried by the cushioning assemblies, and are preferably formed integrally with the structure thereof. The storage chambers are charged with air at the normal pressures available as shop air at the lading platform. That air is then available either for automatically charging the pneumatic elements of each cushioning assembly to its design pressure, or for continuously replenishing air as needed via pressure regulating valve mechanism. Valving arrangements are described for insuring correct air flow among the elements of such apparatus, especially during charging and deflating of the pneumatic elements.

14 Claims, 14 Drawing Figures

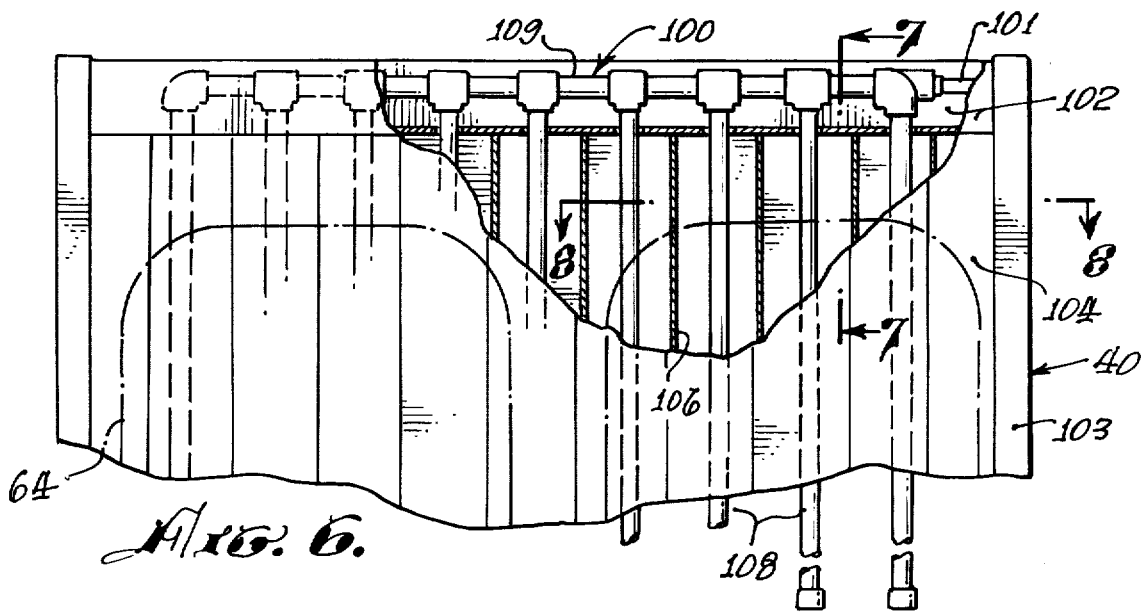
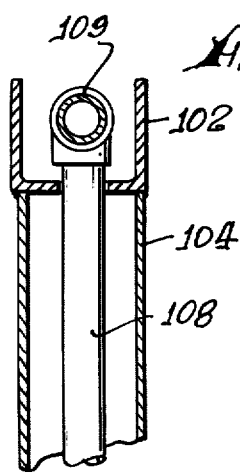
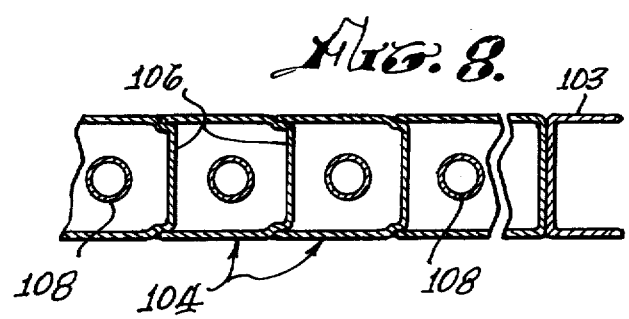
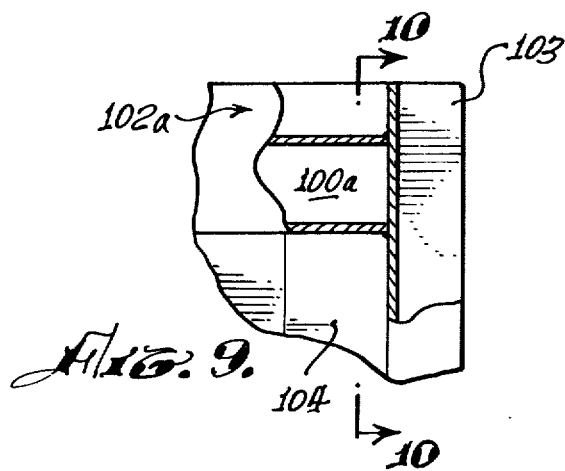

A. FILL
B. TRANSIT
C. DEFLATE
D. EMPTY

SELF-CONTAINED PNEUMATIC LOAD RESTRAINING APPARATUS

FIELD OF THE INVENTION

This invention has to do with pneumatic cushioning devices for restraining the lading in freight-carrying vehicles.

The invention is useful in many types of freight vehicles, but has particular advantages for railroad freight cars. It will be described primarily with respect to that use for the sake of clarity and without intending any limitation of scope.

The invention relates more particularly to inflatable cushioning assemblies comprising relatively movable wall structures separated by pneumatically expandable cushioning elements, such as one or more conventional dunnage bags, for example. The invention is especially useful in connection with such devices in which the cushioning elements operate between a movable load engaging panel and an end wall of the lading compartment, or between a movable panel and a load dividing bulkhead that is movable in conventional manner and is lockable at a selected position in the lading compartment. However, the cushioning assembly may be designed to separate two sections of the lading without providing any rigid anchor to the car structure.

The invention is concerned especially with improved means for charging the cushioning device with air at the proper pressure and with maintaining an adequate supply of pressurized air to insure proper operation of the cushioning device throughout the journey until the loaded car reaches its destination.

THE PRIOR ART

Many patents which describe pneumatic cushioning devices of the present general type overlook completely the problem of maintaining an effective pressure in the pneumatic envelopes throughout a journey of the loaded car. U.S. Pat. No. 3,427,997 to Brown et al. and U.S. Pat. No. 3,791,311 to Loomis are of that type.

Other prior art, of which U.S. Pat. No. 2,960,942 to Pier et al. is illustrative, describe relatively complex air control systems which employ a high pressure air tank mounted below the car body. Such a tank involves technical problems, and may require appreciable modification of the car structure. U.S. Pat. No. 3,067,699 to Fredriks shows a system for cushioning a single rigid container of very large size within a specially constructed car, with supplementary air provided in four tanks which must apparently be disconnected from the system before they can be refilled with gas.

Pat. No. 3,098,455 to McElroy provides an air blower which is driven by an electric motor powered by batteries carried in the car. Such a battery requires frequent charging. That is conceded by McElroy, who also provides a battery charging generator driven from a wheel of the vehicle. Systems of that type are theoretically effective, but are expensive to construct and require maintenance by skilled technicians.

BRIEF DESCRIPTION OF THE INVENTION

The present invention avoids those and other difficulties of previously available load cushioning systems by providing storage means for reserve pressurized air in a form that is self-contained within the structure of the cushioning mechanism itself. That concept permits air cushioning systems to be installed virtually without any alterations of the structure of the car itself. The available useful space in the lading compartment is not reduced by a bulky air tank, and the exterior of the car is not encumbered by such a tank and the structure needed to support and protect it. Moreover, when air is required by any of the expandable pneumatic units in a car, that air is typically available close at hand and may be provided automatically via a pressure regulating valve or equivalent device.

The invention further provides improved valve means in the described system, particularly to facilitate deflating the pneumatic elements. A particular advantage of that control means in one of its forms is the capability of deflating the pneumatic elements while preserving any compressed air that remains in the storage chamber.

A further aspect of the invention permits particularly simple and reliable initial charging of a pneumatic load cushioning assembly. That is accomplished by providing pressure storage means of predetermined size connected to the pneumatic elements of the assembly via a simple control valve. With that valve closed, the storage volume is first charged to the regular line pressure at the loading platform. The filling hose is then disconnected and the control valve is opened. For that mode of operation the tank volume is so related to the normal working volume of the pneumatic elements and their proper working pressure that opening of the valve automatically charges the bags to the required pressure. That procedure requires no precision valving and needs no special skill to operate or maintain. Yet it permits the bags to be filled rapidly and without continuous monitoring of the air pressure, while positively preventing accidental over-filling such as can seriously damage the bags, the lading and even the car itself.

A full understanding of the invention, and of its further objects and advantages, will be had from the following description of certain illustrative manners in which it may be carried out. The particulars of that description, and of the accompanying drawings which form a part of it, are intended only as illustration and not as a limitation upon the scope of the invention.

In the drawings:

FIG. 6 is a fragmentary section on the line 6—6 of FIG. 1 at enlarged scale and partly broken away;

FIG. 7 is a section on the line 7—7 of FIG. 6;

FIG. 8 is a section on the line 8—8 of FIG. 6;

FIG. 9 is a fragmentary section corresponding to a portion of FIG. 6 and representing a modification;

FIG. 10 is a section on the line 10—10 of FIG. 9;

Figure 1:
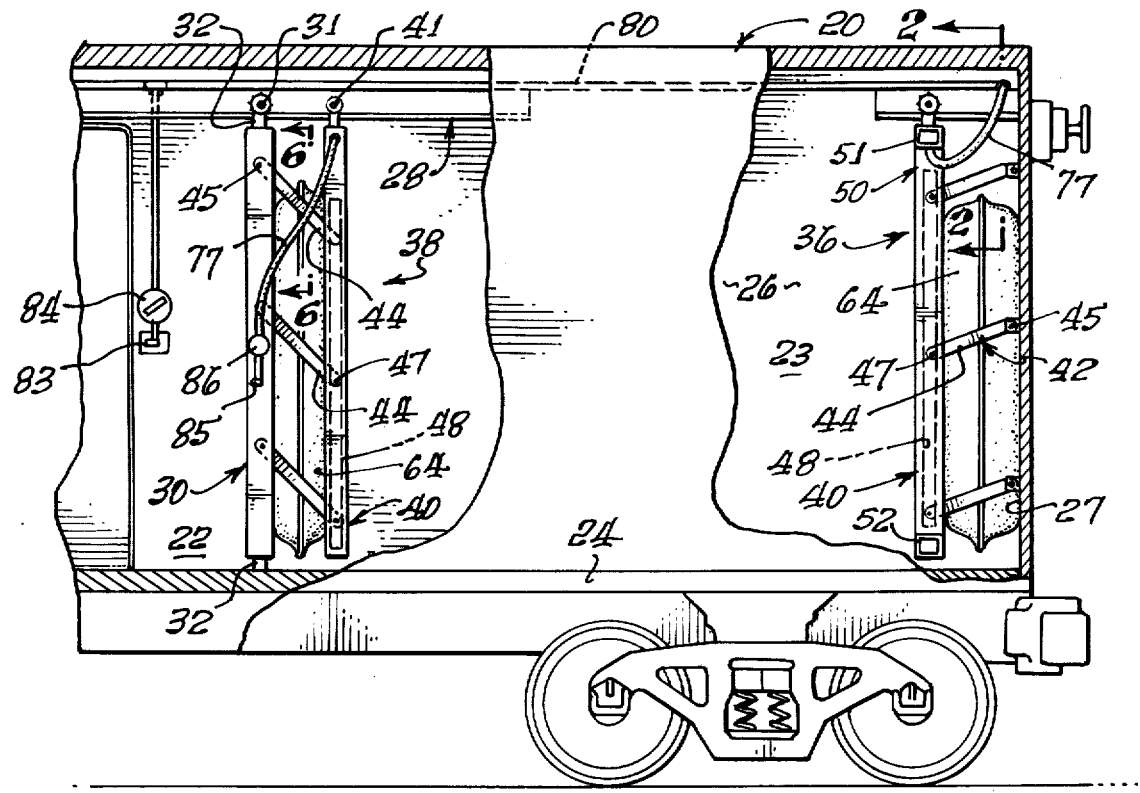
FIG. 1 is an elevation, partly broken away, representing a portion of a railroad freight car embodying the invention.

In the typical freight car of FIG. 1, the lading compartment 22 is partially enclosed by the floor 24, the ceiling 25, the side wall 26 and the end wall 27. A load dividing bulkhead is represented at 30, carried on the ceiling-mounted rails 28 by the sprocketed rollers 31 in conventional fashion, and with locking pins 32 for releasably locking the bulkhead in a selected position. When so locked, bulkhead 30 forms a stationary wall, defining with car end wall 27 the lading compartment subsection 23, which typically occupies somewhat less than half the length of the car.

Load cushioning devices are shown at 36 and 38 at the respective ends of that lading compartment subsection. In actual practice, depending upon such factors as the nature of the lading and the technique by which it is handled, cushioning of the load at one end only is sometimes sufficient. One of the cushioning devices shown can then be omitted. However, provision of both devices has the advantage that one or both may be utilized for each individual shipment. For the sake of clarity, the following description generally assumes that both cushioning devices are utilized. If only one is provided or utilized, the appropriate modifications of that description will be obvious, and are intended to be understood.

The two cushioning assemblies 36 and 38 of FIG. 1 are similar insofar as they comprise an effectively rigid panel 40, which is suspended from rails 28 by the shaft 43 and the rollers 41 for movement relative to a wall of the compartment subsection, and is maintained approximately parallel to that wall by suitable linkage mechanism 42. In each case, panel 40 includes a structural frame 50, formed of upper and lower frame members 51 and 52, vertical channel members 53 at the panel edges and a central vertical channel member 54. The load engaging facing 60, typically of plywood, is mounted on the outer face of panel frame 50. (FIGS. 2 and 3).

Linkage mechanism 42 typically comprises three linkage units associated with the three vertical frame members 53 and 54. Each linkage unit comprises a plurality of links 44, shown as three, which are pivoted at one end on the fixed, vertically spaced axes 45 on the fixed wall 27 or 30. The other ends of the links are pivoted on the axes 47, spaced at corresponding points along a slider 48 which is guided in the associated channel member of the panel frame. Each slider typically comprises two channel sections 49 which slide in opposite U-shaped sections of the channel member and are tied together by the pins 46, which also act as pivot bearings for links 44 (FIG. 3).

Panels 40 of the respective assemblies 36 and 38 are yieldingly urged outward from their respective walls 27 and 30 by the pneumatic cushioning elements 64. Those cushioning elements typically comprise conventional dunnage bags about four feet by eight feet in size, supported by fabric straps 66 or the like on the wall faces. Each panel is typically served by two such bags, mounted in vertical position with sufficient space between them to accommodate the central channel 54. In the case of the bulkhead cushioning device, that spacing may also accommodate handle mechanism for operating the locking pins of the bulkhead. Filling ports are provided near the top of each bag, and flexible hoses 68 typically connect those openings to the common rigid feeder pipe 69 mounted on the panel.

Figure 2:
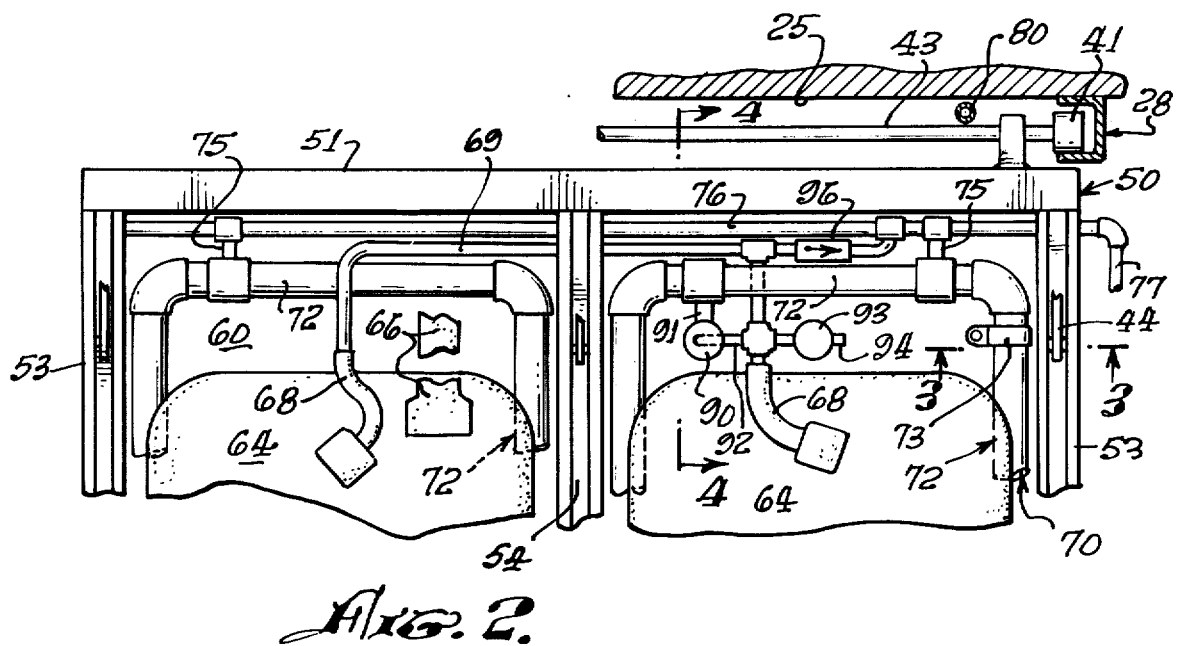
FIG. 2 is a section on the line 2—2 of FIG. 1 at enlarged scale.
Figure 3:
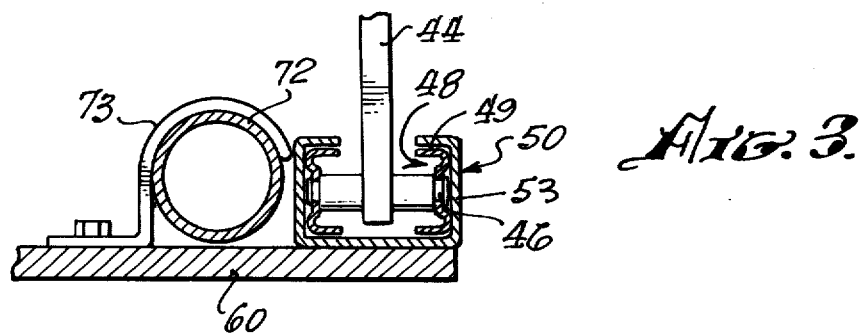
FIG. 3 is a section on the line 3—3 of FIG. 2.
Figure 4:
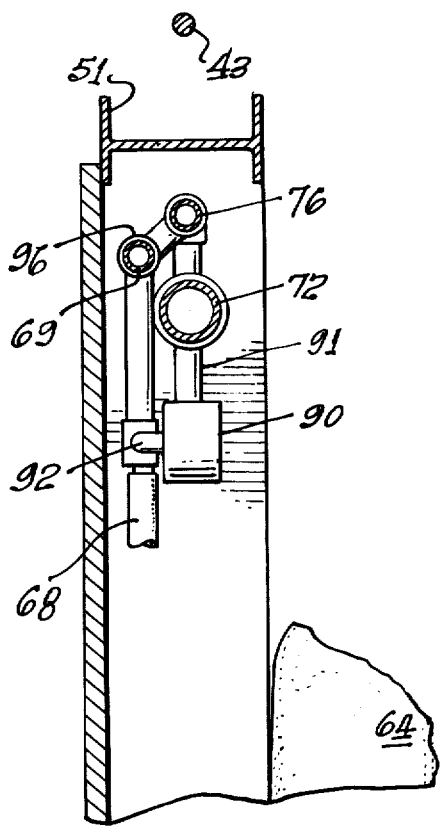
FIG. 4 is a section on the line 4—4 of FIG. 2.

FIG. 2 illustrates more particularly one aspect of the present invention, representing a section taken close to the fixed wall 27 or 30 and looking outward toward air bags 64 and panel 40. In addition to the parts already described, FIG. 2 shows in somewhat fragmentary from the storage reservoir 70. That reservoir may have substantially any form that can fit within panel frame 50 without interfering with the cushioning members to be described, and without preventing the panel assembly from being folded compactly against the face of wall 27 or 30. In the present embodiment, reservoir 70 is formed of conventional pipe which is typically from about 2 to 4 inches in diameter and may be made of metal or of any suitable plastic material, such as polyvinyl chloride, for example. Reservoir 70 comprises the two conduit sections 72, each typically fitted within panel frame 50 just inward of facing 60 and at least partially enclosing one of the pneumatic members 64. The conduit sections are mounted on the panel or the panel frame by the brackets 73. In general each conduit section preferably forms a closed rectangular figure, but it is sometimes advantageous to omit portions of the rectangle. For example, the lower side of each rectangle may be omitted and the conduit ends capped.

Both conduit sections 72 are connected via the pipes 75 to the common inlet header 76. One end of header 76 is connected via the flexible hose 77 and suitable intermediate connections to a quick release fitting which is conveniently accessible for connecting the regular shop air hose at the lading dock to pressurize the system. In the case of the cushioning device at the end of the car, hose 77 is typically connected to the supply pipe 80, fixedly mounted just below the car ceiling and leading to conventional quick release fittings 83 mounted adjacent each of the car doors (FIG. 1). Those air supply fittings 83 may serve both ends of the car, or separate fittings and connections may be provided for each car end, as preferred. The cushioning device on movable bulkhead 30 is preferably provided with a separate air supply quick release fitting, typically mounted at 85 at the side of the bulkhead itself. Alternatively, it may be releasably connected to pipe 80 and thence to supply fitting 83 at the car door for operation of both cushioning devices in parallel.

The air supply fittings 83 and 85 are provided with the respective manual control valves 84 and 86, which are closed to return air in the system after it has been charged. Those valves are opened to permit charging, and also to release air from the system to deflate the cushioning members before unloading the car.

Once the reservoir 70 of one of the cushioning devices has been pressurized, air is automatically metered from that reservoir to the two cushioning elements 64 by the pressure regulating valve 90. As illustratively shown in FIG. 2, that valve receives air from the reservoir at 91, and its delivery port is connected at 92 to feeder pipe 69 and the two bags 64. Valve 90 may include a discharge outlet to atmospheric pressure, through which exceeds pressure is automatically released from bags 64. It is ordinarily preferred to provide a separate relief valve, as indicated at 93, which releases air at 94 when the pressure exceeds a set level, which is higher by a small increment than the pressure at which valve 90 admits air. Cooperative action of pressure regulating valve 90 and relief valve 93 then maintains the pressure in the cushioning members within the defined limits.

A further connection is provided via the check valve 96 between feeder pipe 69 and inlet pipe 76, bypassing pressure regulating valve 90. Check valve 96 is positioned to permit flow only in the direction toward inlet pipe 76, as indicated by the arrow.

In operation of the described system, before the car is loaded air is released from the bags, causing panel 40 to be drawn close to wall 28 or 30, typically by a spring mechanism of conventional construction, not explicitly shown. Bulkhead 30 is moved to provide access. Lading can then be placed against the cushioning device 36 at the car end and compartment subsection 26 filled to the desired extent. Bulkhead 38 is then moved to working position to restrain that lading, and is secured in place in conventional manner by projection of the locking pins 32. When it is desired to inflate the air bags to stabilize the lading in compartment section 26, the regular pressure hose at the lading dock is connected at fitting 83, admitting air via supply pipe 78 to both sections of reservoir 70. The two ends of the car are typically both loaded, and then both are pressurized at the same time. However, if separate supply fittings such as 83 and 85 are provided, each lading compartment section can be pressurized independently after it has been loaded.

As soon as the reservoir pressure exceeds that for which pressure regulating valve 90 has been set, air passes through that valve to both air bags 64, inflating the bags to the set pressure. The lading dock hose is left connected until the reservoir has reached the full line pressure, and preferably also until the air bags have reached their full set pressure. The hose is then removed, leaving the system fully pressurized. Resillient action of the air cushions then tends to maintain the lading in uniform position in the car despite vibration due to the train movement and shocks from humping of the car and similar causes.

Throughout the journey of the loaded car, the pressure in the cushioning units is maintained at the set pressure, within whatever small interval is characteristic of pressure regulating valve 90 and relief valve 93. That is, if the bag pressure falls below the set value, air is automatically admitted by valve 90 to restore that value. If the bag pressure for any reason exceeds the set pressure by more than a small interval, air is released by valve 93 via outlet 94. In both those phases of its pressure regulating function, the valves sense the bag pressure relative to atmospheric pressure. Thus, the regulating action automatically compensates not only pressure changes due to temperature, but also variations of atmospheric pressure, whether due to barometric changes or to changes of elevation above sea level as the car proceeds on its journey.

When the car is to be unloaded, release valves 84 and 86 are opened, discharging to the atmosphere any remaining pressure in reservoir 70. As soon as that pressure drops below the pressure in the bag units, they are deflated via check valve 96. As the bags deflate, panels 40 are drawn toward their respective walls 27 and 30, releasing the lading from restraint. Bulkhead 30 can then be released by retraction of pins 32 and moved out of the path to permit unloading the car.

For some types of cargo it is more convenient to use of a bulkhead constructed in two sections, each serving half of the width of the car, with suspension mechanism to permit the sections to be stowed against the car side wall. Such sectional bulkheads are well known, and can be provided with cushioning means of the present general type if desired.

Figure 5:
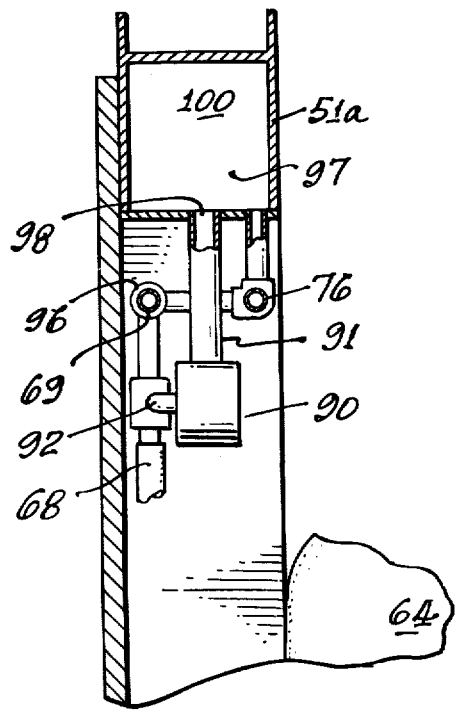
FIG. 5 is a section in the aspect of FIG. 4, representing a modification.

FIG. 5 represents schematically an alternative form of air reservoir in which the reservoir chamber is formed integrally in the frame structure of the panel or of load dividing bulkhead. As illustratively shown, upper beam member 51a of the panel frame is of generally rectangular cross section, with the section forming a closed figure. Such closed sections are available as aluminum extrusions, or are made up by welding together two channels of aluminum or steel. The beam ends are hermetically sealed, as by metal end plates 97 welded in place, thereby forming a closed chamber 100 as an integral part of the frame structure. Inlet and outlet pipes are typically threaded directly in bores in the beam wall, as indicated at 98.

With suitable design the beam 51a requires little or no increase over its conventional weight to provide the mechanical strength needed for its dual role as a frame member and as a chamber for air under normal shop pressure. Especially when such chambers are formed in both the upper and lower beams of the panel frame, the integral chamber volume may provide the entire storage capacity required by the invention. Alternatively, the storage reservoir may include one or more integrally formed storage chambers combined with separately formed chambers mounted on the cushioning assembly.

The described mounting of the storage and control elements of the cushioning assembly on the panel has the particular advantages that those elements are well protected by the outer facing of the panel and that the panel and auxiliary elements form a structural unit that can be removed conveniently as a unit if desired. That is, if a car equipped with such cushioning assemblies is to be transferred for an appreciable period to service where the load compressing and cushioning functions are not required, the conversion is greatly simplified by the described structure.

However, at least part of the advantages of the invention are obtained in assemblies in which the storage or the control elements, or both, are mounted on the wall element of the assembly rather than on the panel. In the case of a cushioning assembly for the end of the car, that somewhat simplifies the air supply connections, since the wall is then always stationary and flexible hose can generally be avoided except for connection to the air bags themselves. For example, the reservoir and control elements of the assembly can be arranged substantially as in FIG. 2, and be mounted on the car end wall in corresponding positions. The frame members of the panel and the air bags will then interfit with those elements essentially as indicated in FIG. 2.

When the cushioning assembly includes a load dividing bulkhead the interior of the bulkhead usually has appreciable volume, and can accommodate a relatively large storage reservoir. However, the structure of the bulkhead sometimes includes cross members which cut the interior into inconveniently small regions. An example of such bulkhead structure is shown somewhat schematically in FIGS. 6 to 8, together with a particularly effective form of air reservoir 100 for use in such bulkheads.

The bulkhead of FIGS. 6 to 8 typically comprises a strong rectangular frame including upper and lower horizontal beams, of which only upper beam 102 is explicitly shown, and the vertical side members 103. The area within that frame is essentially filled with the relatively light vertical channel members 104, which may interlock or be welded together, forming with the frame the flat bulkhead faces. The webs 106 of channel members 104 divide the interior of the bulkhead into vertical chambers 105.

Reservoir structure 100 comprises the conduit sections 108, mounted vertically in respective ones of the bulkhead chambers 105 and projecting upward through bores 107 in the web of upper beam 102. Those conduit sections are sealed at their lower ends and are interconnected at their upper ends by the horizontal conduit section 109, which serves as a header. Section 109 is mounted between the flanges of upper beam 102, which is typically a channel member with open top (FIG. 7). The conduit sections 108 and 109 typically comprise conventional metal or plastic pipe of relatively large diameter, such as two to four inches, for example. Reservoir 100 is typically constructed as a separate unit, which is then assembled to the bulkhead. Air connections to the reservoir are typically made at an end of conduit section 109, as indicated at 101.

Conventional bulkhead structure also offers many opportunities for forming a storage chamber integrally in that structure. As an illustrative example, one or more beams of the bulkhead of FIGS. 6 to 8 may be designed like beam 51a of FIG. 5, with a cross section of closed form. Such structure for upper beam 102 is represented at 102a in FIGS. 9 and 10. The beam ends are sealed by the webs of the respective side beams 103, to which it is welded in abutting relation, forming the integral storage chamber 100a.

Figure 11:
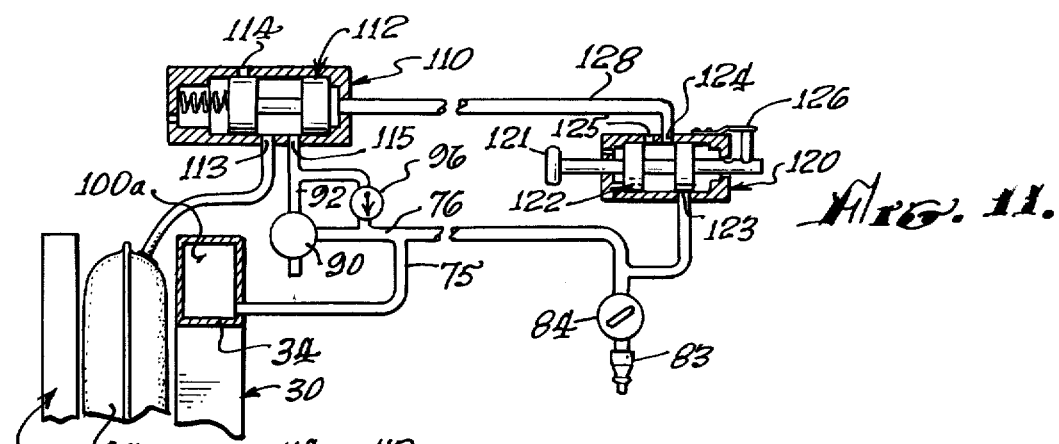
FIG. 11 is a schematic drawing, partly in section, representing a modification in one valve position.
Figure 12:
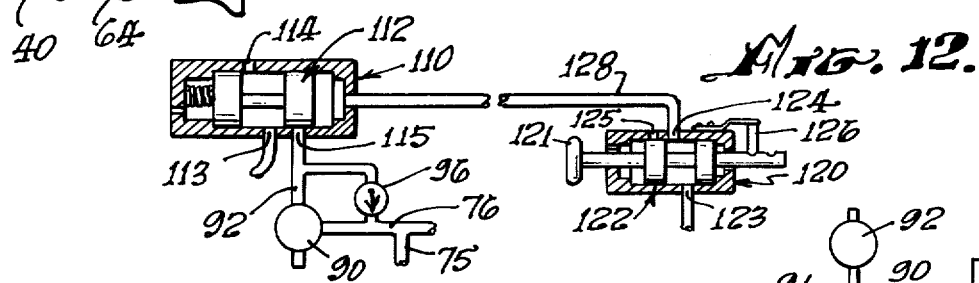
FIG. 12 is a schematic drawing corresponding to FIG. 11 and representing another valve position.

It may sometimes be desirable to release the pressure in the cushioning elements 64 while retaining any compressed air in the storage chamber. With that capability it is feasible, for example, to obtain access to the lading during a journey, as to check or correct its condition, and then recharge the pressure elements in absence of an external source of compressed air. FIGS. 11 and 12 illustrate schematically a modification of the previously described structure which provides convenient and effective means for selectively deflating the pressure elements independently of the storage chamber, especially when the cushioning assembly is inaccessible from the doorway of the car, as is true, for example, of such an assembly associated with the car end wall.

For clarity of illustration in FIGS. 11 and 12, previously described elements of the system are identified by the same numerals but are shown in arbitrary relative positions. Quick release fitting 83 and control valve 84 are typically mounted close to the car door, as shown in FIG. 1, connected via the pressure supply pipe 80 to the cushioning assembly. At that assembly, supply pipe 80 is connected as before to storage chamber 70 and to the pressure inlet of pressure regulating valve 90. However, the control valve 112 is inserted between the outlet from valve 90 and the cushioning elements. that valve may be of any suitable type that can be controlled, preferably remotely, to shift the connection of the cushioning elements between valve 90 and an outlet to the atmosphere.

Control valve 112 is shown illustratively as a two-position spool valve with its spool element 112 urged by the spring 111 toward the operating position shown in FIG. 11. In that valve position, cushioning elements 64 are connected via the valve ports 113 and 115 to the outlet of pressure regulating valve 90, as in the previously described embodiments, and the system operates in the manner already described. In particular, supply of pressure to the system via quick release fitting 83 at the car door pressurizes the reservoir to the full supply pressure and the cushion elements to the pressure set by valve 90; and opening of release valve 84 returns the entire system to atmospheric pressure, with check valve 96 bypassing valve 90.

On the other hand, when control valve 110 is shifted to the idle position shown in FIG. 12, the cushioning elements are connected to atmosphere via the valve port 114, deflating the bags. Loss of air from storage chamber 70 is blocked by valve spool 112, which seals the valve port 115. Operation of control valve 112 to that idle position against the biasing force of spring 111 may be accomplished by direct manual action, or by remote control apparatus of any desired type.

As typically shown, the pilot valve 120 is mounted adjacent the car door with its port 123 connected to pressure supply pipe 80. The pilot valve spool 122 is manually shiftable by the handle 121 between two positions, in each of which it is yieldably but firmly retained by the detent mechanism indicated at 126. With the pilot valve in the position shown in FIG. 12, pressure from port 123 is supplied via the port 124 and the control tube 128 to the end of control valve 110 opposite to spring 111, driving the control valve spool to its idle position to deflate the cushion elements. When pilot valve 120 is manually shifted to the position of FIG. 11, pressure entering the pilot valve is cut off and control tube 128 is connected to atmospheric pressure via ports 124 and 125. The control valve spool 112 is then shifted by its pring 111 to operating position, already described. The pilot valve arrangement thus represents a convenient and reliable means for remotely controlling valve 110.

A separate control valve 110 is typically provided for each of the cushioning assemblies, mounted in close association with the other working elements of the assembly. Such control valves may all be operated in parallel by the same pilot valve via a common control tube 128. If it is preferred that each cushioning assembly be capable of being deflated and inflated individually, a pilot valve is provided for each cushioning assembly, all mounted in an accessible position with appropriate identification.

Figure 13:
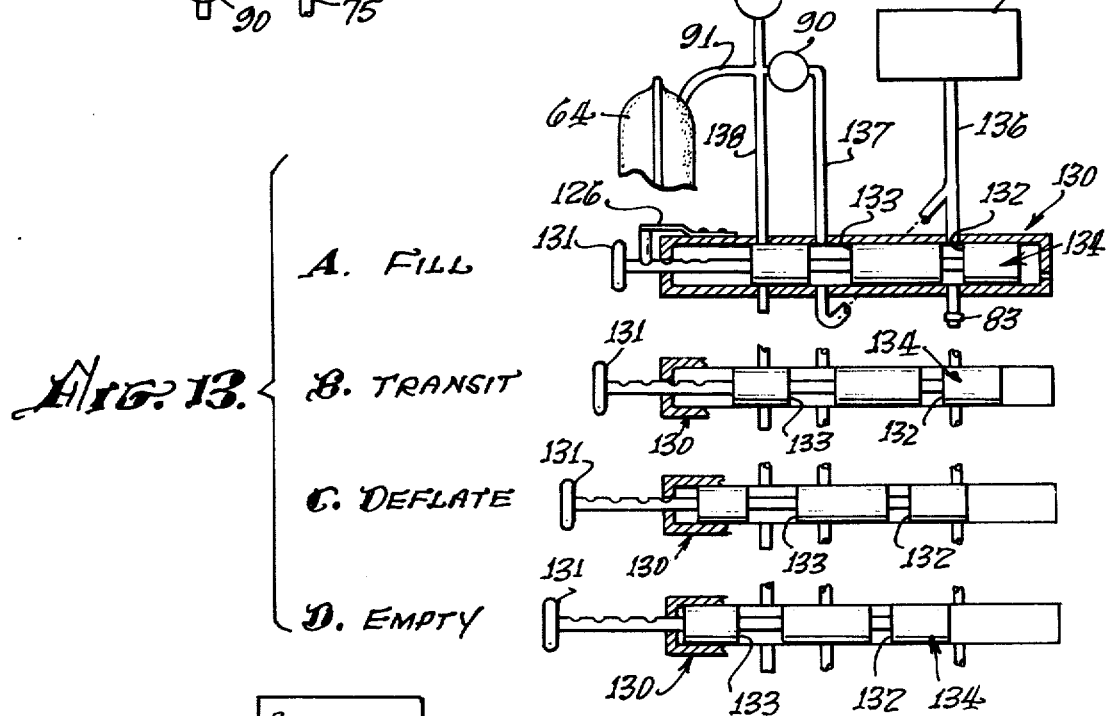
FIG. 13 is a schematic drawing, partly in section, representing a modification.

Another illustrative control valve arrangement is represented schematically in FIG. 13. The spool valve 130 has four positions, shown in respective drawing portions and performing the respective functions: (A) charging the system with air, (B) holding the system in condition for transit with cushioning elements 64 connected to reservoir 70 via regulating valve 90, (C) deflating the cushioning elements while preserving any pressure in the reservoir, and (D) deflating the entire system.

In filling position A, supply fitting 83 is connected via the channel 132 of the valve spool 134 to the pipe 136 and reservoir 70, and also via the channel 133 to the pipe 137 and the inlet of pressure regulating valve 90. Connection of a shop air hose to fitting 83 then charges reservoir 70 to the full shop air pressure, and charges the cushioning elements to the pressure for which valve 90 is set. Before removing the air hose, valve 130 is shifted to its transit position B. Pipe 136 is thereby cut off from fitting 83, sealing the system. However, pressurized air continues to be supplied from reservoir 70 to pressure regulating valve 90, maintaining the proper cushioning pressure during transit. Any excess pressure is typically vented via relief valve 93.

In order to deflate the cushioning elements, for unloading the car or any other purpose, valve 130 is typically shifted to position C. Air from elements 64 is then released via the pipe 138 and valve channel 133. However, any pressure remaining in reservoir 136 is retained, since the reservoir is isolated from both supply fitting 83 and pressure regulating valve 90. If it should then be desired to recharge the cushioning elements from reservoir 70, valve 130 is simply shifted to transit position B. In order to recharge the reservoir, the valve is returned to fill position A, and an air hose is applied at fitting 83.

Under some conditions it may be desired to deflate completely both the cushioning elements and the reservoir. Valve position D serves that function by opening to atmosphere both pipes 136 and 138.

The valve structure 130 of FIG. 13 performs a switching function similar to that of valve 110 of FIG. 11 and also may be considered to replace the dual functions of valve 84, controlling both charging and deflating of the system. When that general arrangement is employed on a cushioning assembly that includes a movable bulkhead, valve 130 or its equivalent is typically mounted on the bulkhead in position to be accessible from the side opposite the lading. When employed on an end-of-car cushioning assembly, valve 130 is typically mounted at the car door, with the pipes 136, 137 and 138 extending from that position to the cushioning assembly.

For carrying out the invention in the mode described above in connection with FIGS. 1 to 13, the volume of the gas storage reservoir depends upon conditions of operation which may vary widely. In general, it is desirable that the volume be large enough to repressurize the load cushioning elements at least once. That is, if these elements have a normal working volume of $V_w$ at a working pressure of $P_w$, and the source pressure to which the reservoir is filled is $P_r$, the reservoir volume $V_r$ is preferably at least about $V_w P_w / P_r$. Especially for relatively long distance shipments, or if the route includes mountainous country where large barometric changes are anticipated, it is desirable to increase that volume appreciably, say by a factor of from two to about four. Thus, assuming for definiteness that $P_w/P_r$ is about 1/20, the reservoir may usefully have a volume $V_r$ from about 1/20 to about 1/5 of the pneumatic element volume $V_w$.

A further aspect of the invention uses a mode of operation different from that discussed above and requires a reservoir volume that is more narrowly defined. In that alternate mode of operation, the reservoir is first charged to the full source pressure $P_r$ while the pneumatic elements are still in deflated condition and are cut off from the reservoir. The pressure source is then disconnected, and the reservoir is directly connected to the cushioning elements until pressure equilibrium is established. The reservoir may then be left connected, or may be again cut off and kept isolated throughout the journey to reduce the possibility of leakage. With that mode of charging the cushioning system, the cushioning elements are automatically raised to a definite pressure which can be expressed as a function of the pressures and volumes involved. Neglecting for clarity small effects due to temperature variations, the pressure produced in that way can be expressed, to a first approximation, as $P_r V_r / V_w$. Therefore, a desired working pressure $P_w$ is obtainable to that degree of approximation by selecting the reservoir to have a volume $$V_r = V_w P_w / P_r \qquad (1).$$

Equation (1) is a satisfactory basis for design if the reservoir volume is only a small fraction of $V_w$, and if the pneumatic elements do not change significantly in volume as they are filled with air. Since pressure equilibrium is reached when $P_r$ has fallen to $P_w$, rather than to zero gauge pressure, a more accurate form for equation (1) is $$V_r = V_w P_w / (P_r - P_w) \qquad (2)$$

Moreover, in practice, when the cushioning elements are deflated the movable panel is ordinarily drawn close to the stationary wall structure, typically by a conventional spring mechanism, as already indicated. The actual volume within the deflated elements is thereby reduced considerably, and may even approach zero, depending upon the detailed design of the structure. If the pneumatic elements are in that condition when air is first admitted from the pressurized reservoir, a significant portion of the air it contains may be required to expand the flexible elements to their working volume while still at substantially atmospheric pressure. That effect may be taken into account to a good approximation by selecting the reservoir volume in accordance with the further equation:

$$V_r = \frac{V_w P_w - (V_w - V_i) P_a}{P_r - P_w} \qquad (3)$$

where $V_i$ represents the initial volume of the deflated pneumatic elements and $P_a$ represents the pressure of the atmosphere, expressed in the same units as the other pressures.

That method of obtaining a desired working pressure in the cushioning elements has the advantage that no pressure regulating valve mechanism is needed and an operator is not required to observe the progress of the charging operation and cut it off at a particular point. He can simply fill the reservoir to the full line pressure and then disconnect and seal off the line. The cushioning elements are then charged by simply opening a valve between them and the reservoir. Since that can be done at any time after the reservoir has been charged, the pressure line does not need to be available at any particular time, and becomes more free for other purposes. To take full advantage of the described charging procedure, mechanism is preferably provided for automatically preventing the operator from accidentally charging the reservoir while it is connected to the cushioning elements.

Figure 14:
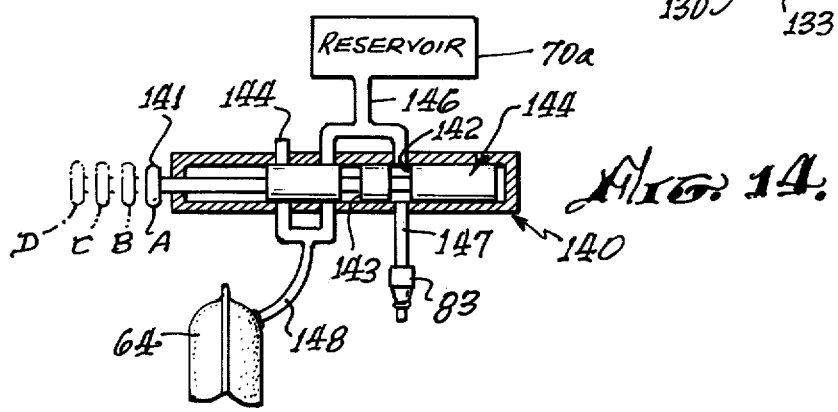
FIG. 14 is a schematic drawing, partly in section, representing a further modification.

An illustrative valve structure for that purpose is shown schematically in FIG. 14 as the valve 140 with the handle 141 and the two valve channels 142 and 143 in the valve spool 144. At the valve position shown in solid lines, with handle 141 at A, reservoir 70a is connected via the pipe 146 and valve channel 142 to the supply pipe 147 and the release fitting 83 for connection of a pressure hose. Reservoir 70a of FIG. 14 may be constructed in any desired manner, including those described above, being distinguished primarily by selection of its volume in substantial accord with one of the above equations.

After the reservoir has been charged to the supply pressure, valve handle 141 is shifted to position B. Supply line 147 is thereby isolated, and the reservoir is connected via channel 143 and the pipe 148 to the pneumatic elements, indicated at 64. After equilibrium has been established, the spool handle may be moved to position C, at which all flow through the valve is cut off. The working pressure is thereby sealed in the cushioning elements, typically throughout the journey. Alternatively, position C may be omitted, and the valve retained in position B during transit.

When it is desired to deflate the cushioning elements, the valve handle is shifted to D, connecting the cushioning elements via valve channel 138 to the atmosphere at 149. Reservoir 70a is then also connected via valve channel 142 to pipe 148 and thence to atmosphere, so that the reservoir is also reset at atmospheric pressure. Remote control of the described charging and releasing procedure may be provided by mounting valve 140 at a remote position, typically near the car door. Only the two conduits 146 and 148 are then required for connecting the valve to the cushioning assembly and reservoir 70a.

I claim:

1. Load cushioning apparatus for a vehicle lading compartment comprising
    two generally parallel and relatively movable wall structures, at least one of the wall structures having a lading engaging face,
    rigid air storage means carried by one of the wall structures for containing compressed gas at a storage pressure of the order of 100 psi,
    flexible pneumatic means between the wall structures for urging the wall structures apart to compress and cushion the lading,
    manually accessible means for connecting a hose to the storage means for charging the same from a wayside compressed gas line,
    and valve means connected between the storage means and the pneumatic means for controlling gas flow therebetween.

2. Apparatus according to claim 1 wherein said storage means comprise a chamber formed as an essentially integral part of one of said wall structures.

3. Apparatus according to claim 1, wherein at least one of said wall structures comprises a flat structural frame which includes a structural beam member having a cross section of closed shape forming a chamber, said storage means comprising said chamber.

4. Apparatus according to claim 1 wherein
    one wall structure comprises a bulkhead mounted in the lading compartment for movement longitudinally thereof and having means for locking the bulkhead in a selected stationary position in the compartment,
    and said storage means comprise a plurality of interconnected conduit sections within the structure of the bulkhead.

5. Apparatus according to claim 4 wherein said bulkhead comprises a planar array of parallel channel sections extending between beam members, and said conduit sections are substantially straight sections lying predominantly within respective channel sections.

6. Apparatus according to claim 1 wherein
    one wall structure comprises a normally stationary wall bounding at least a portion of the lading compartment,
    the other wall structure comprises a substantially rigid panel frame and a panel mounted on the frame and forming said load engaging face,
    and said storage means comprise a plurality of conduit sections mounted within the panel frame adjacent the panel.

7. Apparatus according to claim 6 wherein
    said storage means include also a chamber formed integrally in the structure of the panel frame and interconnected with said conduit sections.

8. Apparatus according to claim 1 wherein
    said pneumatic means comprise a plurality of air bags mounted in laterally spaced relation,
    and said storage means comprise a plurality of interconnected conduit sections at least partially surrounding and generally conforming to the configuration of respective bags.

9. Apparatus according to claim 1 wherein said charging means include manually actuable means for releasing air from said storage means, and said valve means comprise
    pressure regulating valve means for normally admitting gas from the storage means to the pneumatic means to maintain a predetermined pressure therein,
    and a check valve connected in parallel with said pressure regulating valve means for permitting flow only from said pneumatic means toward said storage means.

10. Apparatus according to claim 1,
    said valve means comprising pressure regulating valve means for normally admitting gas from the storage means to the pneumatic means to maintain a predetermined pressure therein,
    said apparatus including also venting means for releasing gas from the pneumatic means to deflate the same,
    and means coupled to the venting means for automatically disabling the pressure regulating valve means to retain pressure in the storage means during deflation of the pneumatic means 11. Apparatus according to claim 10, including manually accessible pneumatic control means for remotely operating said venting means and said disabling means.

12. Apparatus according to claim 1, including means coupling said charging means and said valve means for preventing gas flow from the storage means to the pneumatic means during charging of the storage means.

13. Apparatus according to claim 12, wherein the volume of said storage means is such that when charged to said storage pressure the storage means contains only approximately sufficient gas to charge the pneumatic means to its normal working pressure.

14. The method of charging a pneumatic load cushioning apparatus with air at substantially a predetermined working pressure, comprising
    providing pressure storage means having a predetermined volume,
    charging the storage means with air at normal shop pressure, and
    interconnecting the charged storage means and the uncharged pneumatic means to establish pressure equilibrium therebetween,
    said predetermined volume having such value that the pressure resulting from said equilibrium is substantially said working pressure.

* * * * *